United States Patent
Brandt et al.

(10) Patent No.: US 8,485,505 B2
(45) Date of Patent: Jul. 16, 2013

(54) WHEEL SUSPENSION

(75) Inventors: Robert Brandt, Attendorn (DE); Joerg Neubrand, Freudenberg-Alchen (DE); Hans-Ulrich Kriese, Weissensee (DE)

(73) Assignee: Muhr und Bender KG, Attendorn (DE)

( * ) Notice: Subject to any disclaimer, the term of this patent is extended or adjusted under 35 U.S.C. 154(b) by 701 days.

(21) Appl. No.: 11/958,848

(22) Filed: Dec. 18, 2007

(65) Prior Publication Data

US 2008/0157449 A1 Jul. 3, 2008

(30) Foreign Application Priority Data

Dec. 18, 2006 (DE) .......................... 10 2006 060 149
Apr. 18, 2007 (DE) .......................... 10 2007 018 671
Aug. 12, 2007 (DE) .......................... 10 2007 038 072

(51) Int. Cl.
*B60G 11/56* (2006.01)

(52) U.S. Cl.
USPC ...................... 267/34; 267/217; 280/124.146

(58) Field of Classification Search
USPC ................... 267/286, 167, 180, 220, 221, 34; 280/124.164, 124.179, 124.146
See application file for complete search history.

(56) References Cited

U.S. PATENT DOCUMENTS

| | | | | |
|---|---|---|---|---|
| 176,174 A | * | 4/1876 | French | 267/286 |
| 3,727,940 A | * | 4/1973 | Hug | 280/124.146 |
| 4,120,489 A | * | 10/1978 | Borlinghaus | 267/166.1 |
| 4,377,280 A | * | 3/1983 | Wienand et al. | 267/180 |
| 4,810,231 A | * | 3/1989 | Weissenberger et al. | 464/68.4 |
| 4,903,985 A | | 2/1990 | Muhr et al. | |
| 5,467,971 A | * | 11/1995 | Hurtubise et al. | 267/220 |
| 6,481,701 B2 | | 11/2002 | Kessen et al. | |
| 6,808,193 B2 | | 10/2004 | Brandt et al. | |
| 6,988,718 B1 | * | 1/2006 | Eulenbach et al. | 267/33 |
| 2004/0169322 A1 | * | 9/2004 | Ogura et al. | 267/180 |

FOREIGN PATENT DOCUMENTS

| | | |
|---|---|---|
| DE | 1 505 616 | 7/1970 |
| DE | 34 38 591 A1 | 2/1986 |
| DE | 37 43 451 A1 | 6/1989 |
| FR | 2 699 245 A1 | 6/1994 |
| GB | 1 198 713 | 7/1970 |
| JP | 58149432 A * | 9/1983 |
| JP | 2002-67647 A | 3/2002 |
| WO | 01/56819 A1 | 8/2001 |

* cited by examiner

*Primary Examiner* — Robert A Siconolfi
*Assistant Examiner* — Mariano Sy
(74) *Attorney, Agent, or Firm* — Roberts Mlotkowski Safran & Cole, P.C.; David S. Safran

(57) ABSTRACT

A wheel suspension is described with a wheel-guiding McPherson strut unit which has a helical compression support spring, a shock absorber which is connected on one end to the body and on the other end to the wheel, and a suspension arm, the helical compression spring being made such that the helical compression spring at least partially compensates for transverse forces which occur on the shock absorber without the action of the helical compression spring. To enable the weight of the helical compression spring to be reduced, the helical compression spring is constructed and arranged so that the stress in the spring is at least approximately, preferably exactly, the same on the side of the spring center line or line of action of the spring force facing the wheel as on the side facing away from the wheel. This makes it possible to reduce the weight throughout by roughly 10%.

6 Claims, 4 Drawing Sheets a)  b)  c)

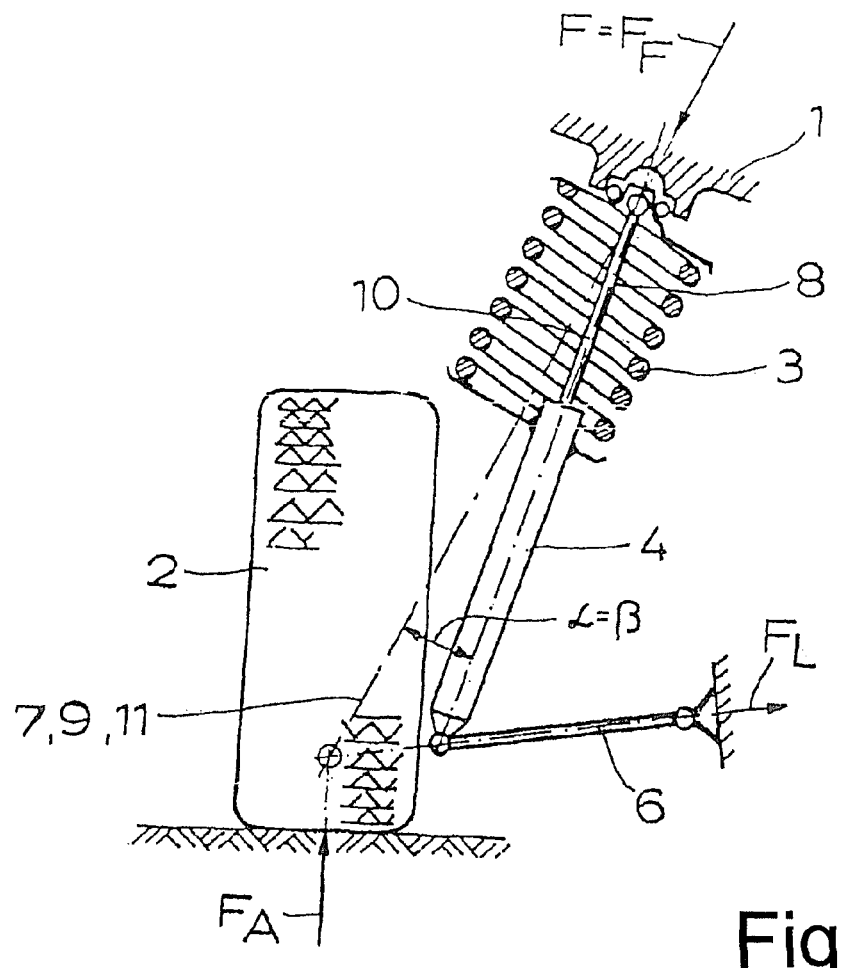
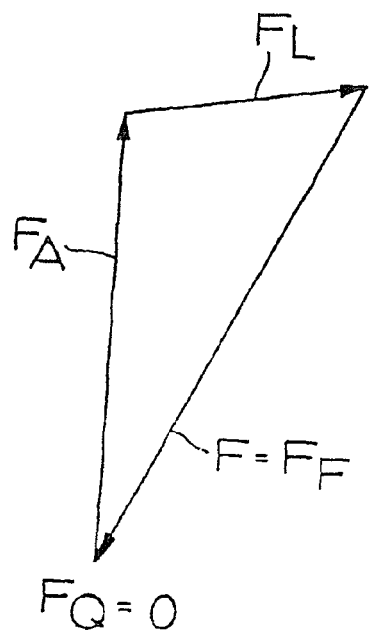
Fig. 2
(Prior Art)

Fig. 4
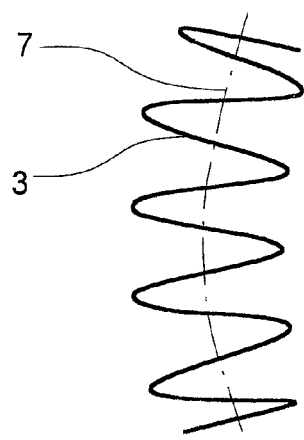
a)
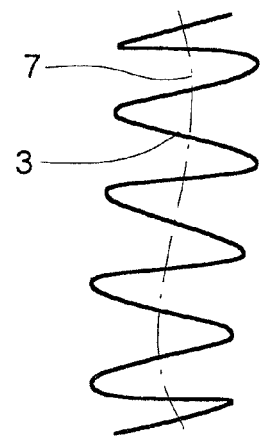
b)
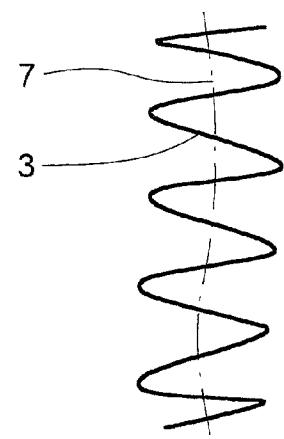
c)

WHEEL SUSPENSION

BACKGROUND OF THE INVENTION

1. Field of Invention

The invention relates to a wheel suspension with a wheel-guiding McPherson strut unit which has a helical compression spring and a shock absorber, and which is connected to the body, on the one hand, and to the wheel on the other, and with a suspension arm, the helical compression spring being made such that it at least partially compensates for the transverse forces which would occur on the shock absorber without the action of the helical compression spring which compensates for the transverse force.

2. Description of Related Art

In wheel suspensions of the type basically under consideration here, also often called McPherson strut wheel suspensions, the upper suspension arm, which is present in other conventional wheel suspensions, is replaced by a long-stroke McPherson strut unit (Lueger "Lexikon Der Technik", Volume 12 "Lexikon Der Fahrzeugtechnik", 1967 Deutsche Verlags-Anstalt GmbH, p. 425).

In the known wheel suspensions underlying the invention, the helical compression spring can first be located concentric to the shock absorber axis. In this connection, the entire transverse force which occurs on the upper support point, therefore on the body, must be accommodated by the piston rod of the shock absorber. This results in considerable friction forces on the piston of the shock absorber, and consequently, in bucking deflection and rebound.

In order to reduce the transverse forces acting on the piston rod of the shock absorber, for a long time, helical compression springs have been installed in the McPherson strut unit such that the line of action of the spring force fomms an acute angle with the shock absorber axis. In the ideal case, the angle between the line of action of the spring force of the helical compression spring and the shock absorber axis would have to correspond to the angle between the line of support action and the shock absorber axis. Then, in the normally loaded state, the piston rod of the shock absorber would be largely free of transverse forces. Only in spring deflection or rebound—around the static equilibrium position, i.e., the normally loaded state—would transverse forces occur. However, generally, the angle between the line of action of the spring force of the helical compression spring and the shock absorber axis can only be made smaller than the angle between the line of support action and the shock absorber axis, since the capacity of the helical compression spring to pass through the shock absorber and sufficient freedom of motion of the wheel must still be ensured.

Due to the continuous widening of tires and the associated displacement of the wheel contact surface to the outside, greater angles occur between the line of support action and the shock absorber axis to which the line of action of the spring force would have to be set when, in the normally loaded state, the piston rod of the shock absorber is to be free of transverse forces.

Since, for the aforementioned reasons, the helical compression spring cannot be sloped with respect to the shock absorber axis as much as would actually be desirable, the line of action of the spring force has been shifted relative to the spring center line, by sloping one end turn or both end turns, by increasing the thickness of the end turns, by sloping the spring plates or by combinations of the aforementioned measures. Thus, within limits, the result has been that the line of action of the spring force on the bottom end of the helical compression spring is farther outside than the spring center line, while the line of action of the spring force and the spring center line on the top end of the helical compression spring pass through the support point.

Since it was still unsatisfactory that the attainable angle between the line of action of the spring force and the shock absorber axis was not yet sufficient, the helical compression spring was made such that the helical compression spring at least partially compensates for the transverse forces which would occur on the shock absorber without the transverse force-compensating action of the helical compression spring. In this respect, reference is made to German Patent Application 1 505 616 which discloses a wheel suspension of the type under consideration with a helical compression spring with a spring center line in the unloaded state (i.e., before installation) which runs roughly in a C shape, and mainly to German Patent DE 37 43 450 C2 and corresponding U.S. Pat. No. 4,903,985 which disclose a wheel suspension of the type under consideration with a helical compression spring with a spring center line in the unloaded state which runs in a roughly S shape. German Patent DE 37 43 450 C2 and corresponding U.S. Pat. No. 4,903,985 describe, in particular, the above addressed problem of "transverse forces on the shock absorber and on the piston rod of the shock absorber", specifically the measure of a "helical compression spring with a spring center line which in the unloaded state runs roughly in a C-shape" is also described as is the measure of a "helical compression spring with a spring center line which in the unloaded state runs roughly in a S-shape. The measure "helical compression spring with a spring center line in the unloaded state which runs roughly in a S-shape", is taught as a further contribution to the solution of the indicated problem of "transverse forces on the shock absorber and on the piston rod of the shock absorber". Wheel suspensions which use the above explained teachings, therefore, have a helical compression spring with a spring center line in the unloaded state which runs roughly in an S-shape, have proven themselves millions of times and are increasingly acquiring importance.

It was stated at the beginning that the invention relates to a wheel suspension to which among others a helical compression spring belongs and in which the helical compression spring is preferably made such that the helical compression spring at least partially compensates for the transverse forces which would occur on the shock absorber without the transverse force-compensating action of the helical compression spring. "In which the helical compression spring is preferably made such that the helical compression spring at least partially compensates for the transverse forces . . . " means mainly, but by no means exclusively, the measures described individually above "helical compression spring with a spring center line in the unloaded state which runs roughly in a C-shape" and "helical compression spring with a spring center line in the unloaded state which runs roughly in a S-shape". These measures refer to the spring center lines of the helical compression springs. On the one hand, for helical compression springs, the spring center lines, of course, are not physically present; only the individual spring turns are present or only the totality of spring turns is present. On the other hand, as far as is known, there is no definition for the spring center lines of helical compression springs. Therefore, it will be described below how, on the one hand, the spring center lines of helical compression springs can be determined, which is what matters, on the other hand, when reference is made to the spring center lines of helical compression springs.

A first process for determining the spring center lines of helical compression springs is characterized in that, first, the casing jacket of the helical compression spring is constructed and that, then, from the constructed casing jacket, the center line of the casing jacket is determined which is equated to the spring center line. This process, however, can only be used to a limited extent; it fails especially wherever spring turns with changing turn diameter are present. Another process for determining the spring center line of helical compression springs is characterized in that, the center points of the spring turn are determined from the arithmetic mean of the turn points and that the connection of the center points of the spring turns which have been determined in this way constitutes the spring center line. Finally, the spring center line of helical compression springs can also be determined by the projections of the individual spring turns being examined in one plane, by the center point of each spring turn being assumed to be the center point of a circle which is approximated to the spring turn, and by the center points of the spring turns obtained in this way being connected to one another.

When reference is made to the spring center lines of helical compression springs, what matters is what importance the spring center lines have for the lines of action of the spring force of helical compression springs. If a helical compression spring has a straight spring center line, the line of action of the spring force which is, of course, always a straight line coincides with the spring center line. For a helical compression spring with a spring center line which runs roughly in a C shape,—in the installed state—the line of action of the spring force is shifted relative to the spring center line which runs straight—in the installed. Conversely, it applies to a helical compression spring with a spring center line which runs roughly in a S shape in the unloaded state that the line of action of the spring force in the installed state runs at an acute angle to the spring center line which runs straight in the installed state.

With consideration of what has been stated above with respect to the lines of action of the spring force of helical compression springs, the spring center line also runs roughly in a C shape when the end turns of the helical compression spring are tilted in the opposite direction, the middle part of the helical compression spring, however, runs straight. What can be achieved with a helical compression spring with a spring center line in the unloaded state which runs roughly in a S shape can also be achieved by the end turns of the helical compression spring being tilted in the same direction when the spring center line otherwise runs in a straight line. Finally, what is achieved with a helical compression spring with a spring center line in the unloaded state which runs roughly in a S shape can also be achieved by a helical compression spring with a spring center line which runs partially in a roughly C shape and with an end turn which is away from the C-shaped part and which is tilted in the opposite direction.

In addition to the problem described in particular above "transverse forces on the shock absorber and on the piston rod of the shock absorber", for wheel suspensions of the type under consideration there is another problem. The forces and moments acting in the system specifically cause additional loading on the steering which has a destabilizing effect for the steering assembly, due to the elastic resilience of the system; this results from the following:

In the system under consideration here the acting forces are
the wheel contact force with a direction which runs perpendicular to the wheel contact plane,
b) the arm force which runs in the plane of the suspension arm and passes through the lower bearing point, and
c) the helical compression spring force which should lie in the plane of primary loading, the plane of primary loading being determined by the upper bearing point, by the lower bearing point and by the wheel contact point.

If the helical compression spring force does not lie in the plane of primary loading, a reaction force arises in the direction of driving. If the suspension arm were perfectly rigid, the component of the helical compression spring force which acts in the direction of driving would be captured by the suspension arm. In reality, the wheel suspension is, however, altogether elastic; the suspension arm and the steering assembly can be deformed. The component of the helical compression spring force which acts in the direction of driving is therefore only partially captured by the suspension arm, it acts partially into the steering assembly.

Conventionally, it applies that the drive forces are the same on the left side of the vehicle and on the right side of the vehicle, while the reaction forces, therefore the components of the helical compression spring force which act in the direction of driving, are usually different on the two sides of the vehicle. The difference between the components of the helical compression spring forces which act in the direction of driving on the left side of the vehicle and on the right side of the vehicle can be explained with a different slope of the line of action of the spring force as a result of wobbling of the helical compression spring force. The difference between the components of the helical compression spring forces acting in the direction of driving on the left side of the vehicle and on the right side of the vehicle contributes to an unwanted destabilizing steering moment arising in the steering assembly. Under the action of this destabilizing steering moment, the vehicle drifts on one side away from driving in a straight line.

To compensate for the above explained destabilizing steering moment, it has already been suggested that the line of action of the spring force be allowed to run skewed relative to the center line of the shock absorber. This behavior, which is explained further below, is achieved in a first embodiment disclosed by PCT Patent Application Publication WO 01/56, 819 A1 by inclining the helical compression spring relative to the shock absorber axis in the plane perpendicular to the lengthwise direction of the vehicle, on the one hand, and by the center line running in a S shape or C shape in the plane in the lengthwise direction of the vehicle, on the other hand, in a second embodiment known from German Patent DE 101 25 503 C1, by the spring center line of the helical compression spring running roughly in a S shape in a plane running perpendicular to the lengthwise direction of the vehicle, and the spring center line of the helical compression spring running roughly in a C shape or S shape in a plane running in the lengthwise direction of the vehicle, each applying to the unloaded state of the helical compression spring. The following applies to the embodiment described last.

For the purpose of the following, the planes running perpendicular to the lengthwise direction of the vehicle will be considered the XZ planes, and the planes running in the lengthwise direction of the vehicle the YZ planes. On this basis, the line of action of the spring force running skewed to the center line of the shock absorber means that, on the one hand, the line of action of the spring force runs obliquely to the projection of the spring center line on the XZ plane, and on the other hand, obliquely to the projection of the spring center line on the YZ plane. (Projection of the spring center line here always means the projection of the spring center line of the installed helical compression spring). Because the line of action of the spring force runs obliquely to the projection of the spring center line on the YZ plane, the forces which occur otherwise on the shock absorber and on the piston rod of the shock absorber are reduced, while the line of action of the spring force running obliquely to the projection of the spring center line on the YZ plane reduces or minimizes or eliminates the forces which result from the difference between the components of the helical compression spring forces acting in the direction of driving on the left side of the vehicle and on the right side of the vehicle. The forces which occur due to the line of action of the spring force running roughly obliquely to the projection of the spring center line on the YZ plane compensate at least partially for the unwanted destabilizing forces which are otherwise routed into the steering assembly, resulting from the difference between the components of the helical compression spring forces acting in the direction of driving on the left side of the vehicle and on the right side of the vehicle, by which driving the vehicle in a straight line is improved or guaranteed.

The described wheel suspensions known from DE 37 43 450 C2 and corresponding U.S. Pat. No. 4,903,985 and from DE 101 25 503 C1 have proven extremely satisfactory millions of times in different types of motor vehicles of various motor vehicle manufacturers.

In the continued development of motor vehicles, a priority goal for many years has been to reduce weight; many components and parts of motor vehicles are also being further developed with this focus. Weight reduction can be achieved mainly, on the one hand, by using specifically lighter materials, for example, aluminum instead of steel, and on the other hand, by higher stress—it can also be expressed: better use— of the materials used, but finally, also by design or construction measures.

SUMMARY OF THE INVENTION

Therefore, a primary object of the present invention is to improve the wheel suspension known from German Patent DE 37 43 450 C2 and corresponding U.S. Pat. No. 4,903,985 and the wheel suspension known from German Patent DE 101 25 503 C1 with respect to weight reduction.

The wheel suspension in accordance with the invention in which the aforementioned object is achieved is, first of all, essentially characterized in that the helical compression spring is made and/or installed such that the maximum stress in the helical compression spring is at least roughly the same on two sides of the spring center line or line of action of the spring force. This requires explanation which is provided in the detailed description below.

The teaching of the invention includes first of all the finding that for helical compression springs which in the unloaded state run at least roughly in a C shape, at least roughly in a S shape or partially roughly in a C shape and partially in a S shape, the maximum stress on both sides of the spring center line or line of action of the spring force is different. This also applies to known wheel suspensions in which the line of action of the spring force relative to the spring center line is shifted or pivoted by other than the above described measures, specifically by sloping one end turn or both end turns, by increasing the thickness of the end turns, by sloping the spring plates or by combinations of the aforementioned measures.

All measures which are known in the prior art and which are used for reducing the transverse force or for transverse force compensation generally lead to the line of action of the spring force being shifted relative to the spring center line. Consequently, the stress of the helical compression spring on the side facing away from the wheel is greater than the stress of the helical compression spring on the side facing the wheel. Therefore, the maximum stress of the helical compression spring on the side facing away from the wheel in the prior art determines the design of the helical compression spring, especially the diameter of the spring wire and the weight of the helical compression spring. Because, in accordance with the invention, the helical compression spring is made and/or installed such that in the helical compression spring the stress on two sides of the spring center line or line of action of the spring force, i.e., on the side facing away from the wheel and on the side facing the wheel, is at least roughly the same, the helical compression spring can be more favorably dimensioned.

A first approach to specifically implementing the above explained teaching is characterized in that at least one turn of the helical compression spring, but possibly also all turns of the helical compression spring, has a spring wire diameter which changes between a minimum value, a maximum value and again the minimum value. Preferably, the spring wire diameter of the turn or turns changes exactly once per turn between the minimum value, a maximum value and again the minimum value.

The aforementioned possibility of implementing the teaching of the invention is relatively complex, because a special spring wire must be used, specifically one in which the spring wire diameter changes again and again between a minimum value, a maximum value and again a minimum value. Therefore, a second approach to specifically implementing the above explained teaching that is less complex is characterized in that, preferably with consideration of the location of the upper and lower point of force application of the helical compression spring, the body of the helical compression spring is made such that the stress of the helical compression spring and the stress in the helical compression spring on both sides of the spring center line or the line of action of the spring force are at least roughly the same. In this embodiment, therefore, the body of the helical compression spring undergoes displacement and the spring center line in the region of the active turns of the body of the helical compression spring is systematically shifted relative to the line of action of the spring force. This can be considered a "body offset". Preferably, the procedure is such that, at least approximately, preferably exactly, half of the helical compression spring is implemented on the side of the line of action of the spring force facing the wheel and at least approximately, preferably exactly, the other half of the helical compression spring is implemented on the side of the line of action of the spring force facing away from the wheel.

The upper point of force application and the lower point of force application are set by inclining the end turns of the helical compression spring and/or by forming the spring center line so that in the unloaded state it runs roughly in a C shape or S shape or partially roughly in a C shape and partially roughly a S shape.

In particular, there are a host of possibilities for embodying and developing the wheel suspension in accordance with the invention and one preferred embodiment of the wheel suspension in accordance with the invention is described below in conjunction with the accompanying drawings.

BRIEF DESCRIPTION OF THE DRAWINGS

FIG. 2 is a representation of a wheel suspension in which transverse forces no longer occur, FIGS. 4a-4c show helical compression springs having a spring center line that, in the unloaded state, runs roughly in a C shape, an S shape and a partially roughly a C shape and partially roughly S shape, respectively.

DETAILED DESCRIPTION OF THE INVENTION

Figure 1:
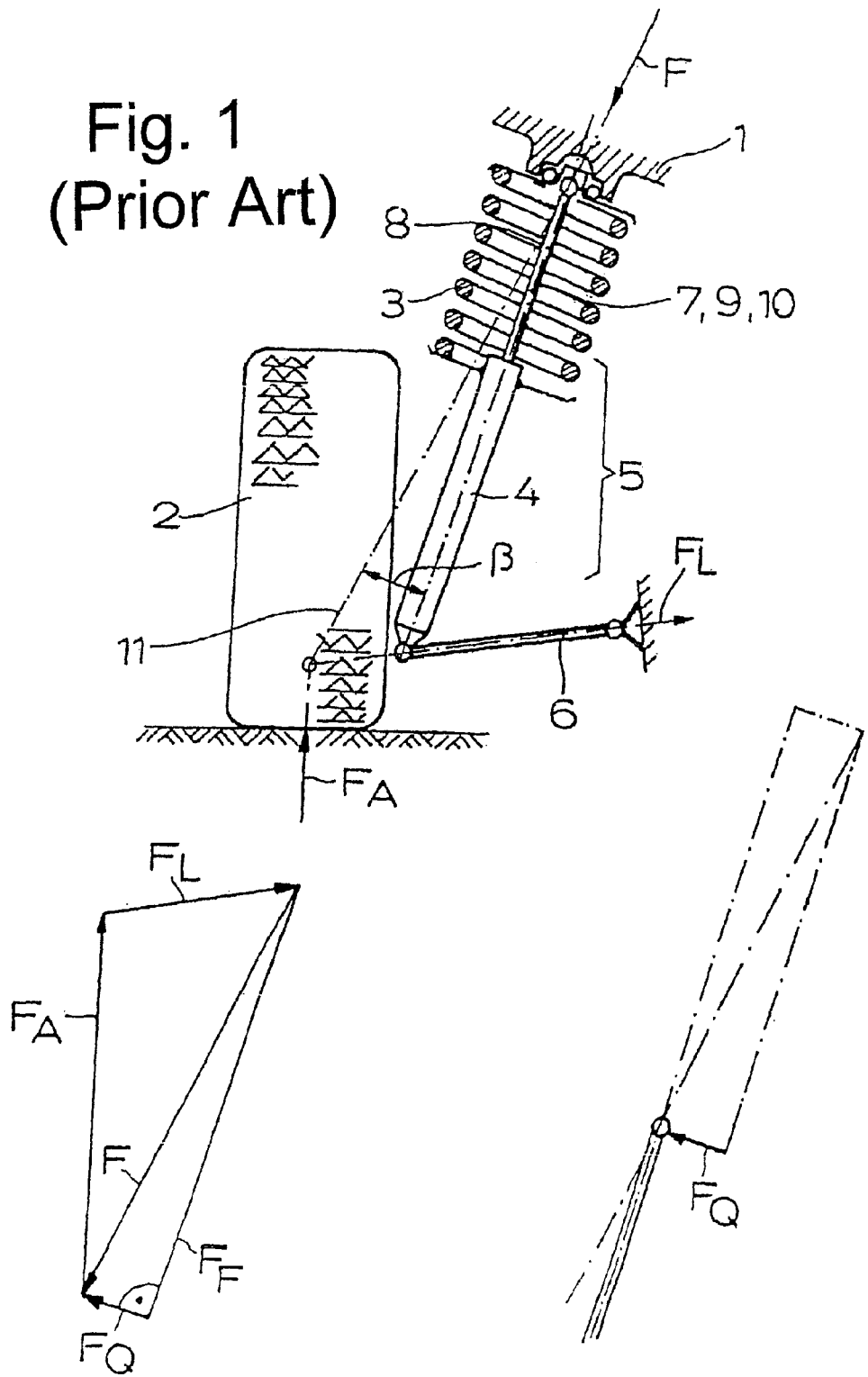
FIG. 1 is a representation for use in explaining the forces which occur in a wheel suspension of the type under consideration.

With reference to FIG. 1 (which corresponds to FIG. 1 of U.S. Pat. No. 4,903,985), the forces which occur in a wheel suspension of the type to which the present invention is directed will be explained. These forces, or force components, are the spring force $F_F$ of the helical compression spring (which is called a support spring and, conventionally, also known as an axle spring) that results from the weight of the motor vehicle falling proportionally on the individual wheel suspensions, the wheel contact force $F_A$, the pull rod force $F_L$, the body support force F and the transverse force $F_Q$.

As stated, the wheel suspension in accordance with the invention includes a wheel-guiding McPherson strut unit which is connected, on the one hand, to the body, and on the other hand, to the wheel. The McPherson strut unit comprises a helical compression spring 3 and a shock absorber 4. The helical compression spring 3 is active between an upper point of force application and a lower point of force application. Specifically, the helical compression spring 3 is active between an upper spring plate $P_U$, which is often supported in an articulated manner on the body, and a lower spring plate $P_L$ which is connected to the shock absorber.

The helical compression spring 3 which belongs to the wheel suspension in accordance with the invention is therefore—in the installed state—clamped between the upper spring plate $P_U$ and the lower spring plate $P_L$. In this connection, the end turns of the helical compression spring 3 adjoin the assigned spring plate in a quite different manner, also depending on how strongly the helical compression spring is loaded, therefore how strongly it is deflected.

The point of force application of the helical compression spring 3 is defined as the intersection point of the line of action of the spring force with a reference plane. The upper point of force application is therefore the intersection point of the line of action of the spring force with the plane of the upper spring plate $P_U$, and accordingly, the lower point of force application is the intersection point of the line of action of the spring force with the plane of the lower spring plate $P_L$.

The wheel suspension shown in FIGS. 1 & 2 includes a wheel suspension with a wheel-guiding McPherson strut unit 5 which has a helical compression spring 3 (support spring or axle spring) and a shock absorber 4 and which is connected to the body 1 and to the wheel 2, and a suspension arm 6. The spring center line 7 of the helical compression spring 3 is also shown; in helical compression springs, the spring center lines are not physically present.

As can be taken from FIG. 1, a force equilibrium is established between the different forces, specifically between the wheel contact force $F_A$, the arm force $F_L$, the body support force F, the spring force $F_F$ and the transverse force $F_Q$. The unwanted transverse force $F_Q$, which leads to friction forces on the piston of the shock absorber 4 and which is to be accommodated by the piston rod 8 of the shock absorber 4, results from In the wheel suspension which is shown in FIG. 2 (which corresponds to FIG. 2 of U.S. Pat. No. 4,903,985), the angle α between the line of action of the spring force 9 of the helical compression spring 3 and the shock absorber axis 10, on the one hand, and the angle β between the line of support action 11 and the shock absorber axis 10, on the other hand, are the same; therefore the line of action of the spring force 9 and the line of support action 11 coincide. This situation results in the helical compression spring force $F_F$ and the body support force F being the same, and the transverse force $F_Q$ is therefore zero.

It was stated above that, for wheel suspensions of the type to which the present invention is directed, the helical compression spring is made such that the helical compression spring at least partially compensates for the transverse forces which would occur on the shock absorber without the action of the helical compression spring which compensates for the transverse force. In the wheel suspension in accordance with the invention, the helical compression spring is also made in the described manner, i.e., with a spring center line that, in the unloaded state, runs roughly in a C shape, or in an S shape or partially roughly in a C shape and partially roughly in an S shape, as shown in FIGS. 4a-4c, respectively.

In the wheel suspension in accordance with the invention, the measures can also be implemented which are described above for compensation of the explained destabilizing steering moment; these measures can also be implemented, but need not necessarily be.

In the embodiment of a wheel suspension in accordance with the invention which is shown in the figures, the upper and lower point of force application of the helical compression spring 3 are chosen such that in the helical compression spring 3, the stress on the two sides of the spring center line 7 and the line of action of the spring force 9 is at least roughly the same. In this embodiment, therefore, the body of the helical compression spring 3 has undergone a displacement; this can be considered a "body offset". In particular, the procedure is such that at least approximately, preferably exactly, half of the helical compression spring 3 is implemented on the side of the line of action of the spring force 9 facing the wheel 2 and at least approximately, preferably exactly, the other half of the helical compression spring 3 is implemented on the side of the line of action of the spring force 9 facing away from the wheel 2.

In this embodiment, the "body offset", therefore. the certain choice of the upper point of force application and the lower point of force application of the helical compression spring 3, is implemented in that the position of the upper end turns 12 of the helical compression spring 3 is selected accordingly, therefore, the corresponding sloping of the upper end turn 12 of the helical compression spring 3 is implemented.

Figure 3:
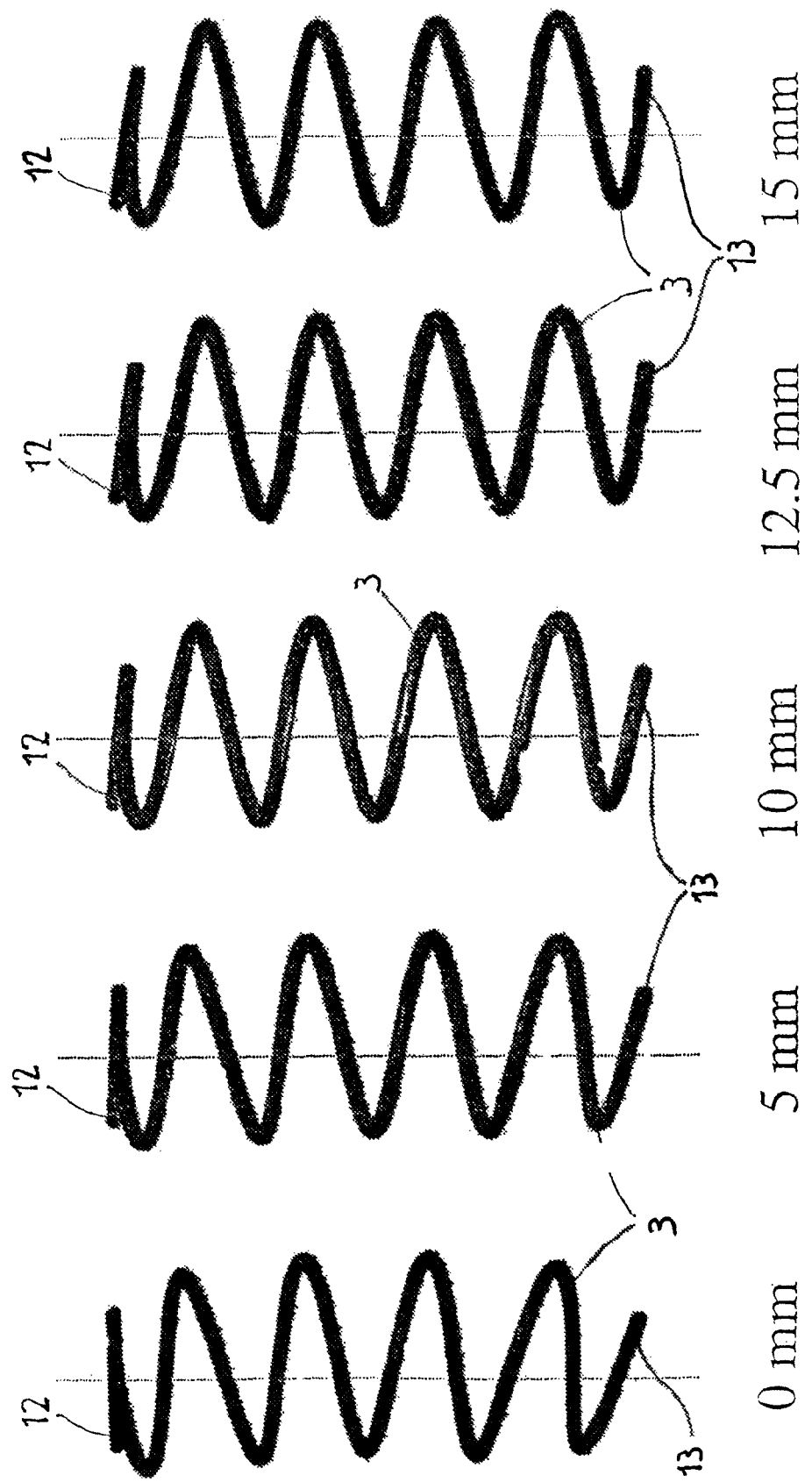
FIG. 3 shows different embodiments of helical compression springs for wheel suspension in accordance with the invention.

In this respect, FIG. 3 shows five different embodiments of helical compression springs 3 which belong to a wheel suspension and each of which itself lead to complete compensation of the transverse force $F_Q$ in the installed state.

In the helical compression spring 3 shown at left in FIG. 3, the teaching of the invention is not implemented; the "body offset" is 0 mm.

In the helical compression springs 3 shown then in FIG. 3, therefore, beginning with the second from left, a respective "body offset" is implemented, as indicated by 5 mm, 10 mm, 12.5 mm, and 15 mm. In this way, the upper point of force application is increasingly shifted to the left and the line of action of the spring force is swung counterclockwise, accordingly.

Tests have shown that the measure in accordance with the invention can greatly reduce the maximum stress in the helical compression spring 3. For a certain helical compression spring 3, therefore with certain, always the same parameters, the maximum stress is 1344 MPa in the helical compression spring 3 shown at left in FIG. 3. For the helical compression springs shown in FIG. 3, the maximum stress, in the illustrated helical compression springs 3 from left to right, decreases continuously, from 1293 MPa to 1243 MPa to 1215

MPa to only 1197 MPa. This means that the specific helical compression spring 3, as shown at right in FIG. 3, can be reduced in terms of mass by 10%; so that a mass of 2.0 kg can be used instead of a mass of 2.26 kg.

What is claimed is:

1. Wheel suspension with a wheel-guiding McPherson strut unit, comprising
   a helical compression support spring,
   a shock absorber which is connected to a vehicle body at one end and to the a wheel at an opposite end, and
   a suspension arm,
   wherein the helical compression spring, in an unloaded state, is configured in a manner that the spring center line runs at least roughly in one of a C-shape, an S-shape, and partially roughly in a C-shape and partially in a S-shape,
   wherein the helical compression spring is configured and arranged to at least partially compensate for transverse forces which occur on the shock absorber without the action of the helical compression spring,
   wherein the helical compression spring is also configured and arranged in a manner causing maximum stress therein to be at least approximately the same on a side of the spring center line facing the wheel as on a side thereof facing away from the wheel, and
   wherein essentially half of the helical compression spring is implemented on the side of the line of action of the spring force facing the wheel and essentially another half of the helical compression spring is implemented on the line of action of the spring force facing away from the wheel.

2. Wheel suspension in accordance with claim 1, wherein with consideration of a location of an upper and lower point of force application of the helical compression spring, the stress of the helical compression spring on said sides of both of the spring center line and the line of action of the spring force is at least approximately the same.

3. Wheel suspension in accordance with claim 2, wherein the spring center line in a region of active turns of the spring body is systematically shifted relative to the line of action of the spring force such that the line of action of the spring force and a line of support action of the shock absorber do not coincide.

4. Wheel suspension with a wheel-guiding McPherson strut unit, comprising a helical compression support spring, a shock absorber which is connected to a vehicle body at one end and to the wheel at an opposite end, and a suspension arm, wherein the helical compression spring is configured and arranged to at least partially compensate for transverse forces which occur on the shock absorber without the action of the helical compression spring,
   wherein the helical compression spring in the unloaded state is configured in a manner that the spring center line runs at least roughly in a C-shape, at least roughly in a S-shape or partially roughly in a C-shape and partially in a S-shape,
   wherein the helical compression spring is also configured and arranged in a manner causing maximum stress therein to be at least approximately the same on a side of the spring center line facing the wheel as on a side thereof facing away from the wheel, and
   wherein essentially half of the helical compression spring is implemented on the side of the line of action of the spring force facing the wheel and essentially another half of the helical compression spring is implemented on the side of the line of action of the spring force facing away from the wheel.

5. Wheel suspension in accordance with claim 4, wherein a body offset is provided in which the spring center line in the region of the active turns of the body of the helical compression spring is offset relative to the line of action of the spring force.

6. Wheel suspension in accordance with claim 5 wherein said body offset comprises an offsetting of the uppermost turn of the helical compression spring.

\* \* \* \* \*